United States Patent [19]
Yoshida et al.

[11] Patent Number: 5,611,877
[45] Date of Patent: Mar. 18, 1997

[54] JIGS FOR MANUFACTURE OF JOINED CERAMIC STRUCTURE, AND METHOD FOR MANUFACTURING JOINED CERAMIC STRUCTURE BY USE OF JIGS

[75] Inventors: Toshihiro Yoshida, Nagoya; Keiichiro Watanabe, Kasugai, both of Japan

[73] Assignee: NGK Insulators, Ltd., Nagoya, Japan

[21] Appl. No.: 407,066

[22] Filed: Mar. 20, 1995

[30] Foreign Application Priority Data

Mar. 22, 1994 [JP] Japan .................................. 6-050171

[51] Int. Cl.⁶ .............................. B32B 31/26; F28F 7/00; C04B 37/00
[52] U.S. Cl. .............................. 156/89; 156/293; 269/56; 165/79; 29/726.5; 29/890.04; 269/47; 269/50; 269/900; 269/902; 269/909
[58] Field of Search ........................ 156/89, 293; 165/76, 165/79; 29/726, 726.5, 890.38, 890.04, 890.43, 890.54; 264/56, 60; 269/37, 40, 43, 47, 49, 50, 52, 900, 902, 909

[56] References Cited

U.S. PATENT DOCUMENTS

| | | | |
|---|---|---|---|
| 4,016,313 | 4/1977 | Schrewelius | 428/35 |
| 4,204,312 | 5/1980 | Tooker | 29/523 |
| 4,601,332 | 7/1986 | Oda et al. | |
| 4,787,443 | 11/1988 | Fukatsu et al. | |
| 4,873,208 | 10/1989 | Nagata et al. | 501/89 |
| 4,875,712 | 10/1989 | Oda et al. | 285/47 |
| 5,106,550 | 4/1992 | Yogo et al. | 264/60 |
| 5,209,525 | 5/1993 | Ito | 285/137.1 |

FOREIGN PATENT DOCUMENTS

| | | |
|---|---|---|
| 0158472A2 | 10/1985 | European Pat. Off. . |
| 0197548A2 | 10/1986 | European Pat. Off. . |
| 2533895B2 | 2/1976 | Germany . |
| 3343577A1 | 6/1984 | Germany . |
| 3816025C2 | 12/1988 | Germany . |
| 3931008A1 | 3/1991 | Germany . |
| 4410767A1 | 10/1994 | Germany . |
| 58-209434 | 12/1983 | Japan .................................. 29/890.43 |
| 6-279131A | 10/1994 | Japan . |
| 2131411 | 6/1984 | United Kingdom . |

*Primary Examiner*—David A. Simmons
*Assistant Examiner*—M. Curtis Mayes
*Attorney, Agent, or Firm*—Ronald J. Kubovcik, Esq.

[57] ABSTRACT

Jigs usable in a method for manufacturing a joined ceramic structure having a plurality of tubes and perforated plates joined to both the end portions of these tubes which has the steps of inserting the tubes of sintered ceramics into through-holes of the perforated plates of unsintered ceramics having a plurality of the through-holes, thereby integrally joining both the members by the utilization of a difference between firing shrinkage ratios of both the members; the jigs having end portions which are inserted into jig fixation orifices beforehand formed through the perforated plates and which have an outer diameter slightly smaller than a diameter of the orifices, and stems having an outer diameter larger than the diameter of the jig fixation orifices, the end portions and the stems being constituted so as to be detachably combined at engagement portions where they are engaged with each other without mutual restriction, the jigs being integrally combined with the joined ceramic structure after the completion of the joining. Position deviation by the firing shrinkage of the perforated plates can be effectively prevented, whereby the joined ceramic structure having excellent shape accuracy and excellent airtightness at joined portions can be obtained.

7 Claims, 5 Drawing Sheets

JIGS FOR MANUFACTURE OF JOINED CERAMIC STRUCTURE, AND METHOD FOR MANUFACTURING JOINED CERAMIC STRUCTURE BY USE OF JIGS

BACKGROUND OF THE INVENTION

1. Field of the Invention

The present invention relates to jigs for use in the manufacture of a joined structure of a perforated ceramic plate and a ceramic tube, and a method for manufacturing a joined ceramic structure by the use of the above-mentioned jigs.

2. Description of the Related Art

Ceramics have high heat resistance and heat-insulating properties, electrical and electronic characteristics such as insulation, conductivity, magnetic and dielectric properties, and excellent mechanical properties such as wear resistance, whether the constitutional composition of the ceramics is an oxide or a monoxide. These ceramics have already been used as materials for various structures, and the research and development of the ceramics have also been advanced.

In the case that the ceramics are used as materials for mechanical parts and structural members, these mechanical parts and structural members are required to have various shapes, and combinations of the respective parts and members are also demanded. Therefore, it is often required to join and fix the ceramic parts and elements to each other at various portions except the integrally molded ceramic structures.

Among various kinds of parts and members, joined structures each comprising a combination of a plate-like member and another member having a different shape have often been used as the mechanical parts and the structural members, and structures formed by inserting tubes into a plurality of holes perforated through the plates have also often been used. For example, in a shell-and-tube type heat exchanger or the like, a member is used which can be formed by joining and fixing perforated plates having a plurality of holes to both the end portions of a plurality of ceramic tubes.

As a method for preparing a joined ceramic structure in which the perforated plates are joined to both the end portions of each of the plurality of ceramic tubes, there is known a method which comprises inserting the end portions of the tubes of sintered ceramics into through-holes 3 of such perforated plates 1 of unsintered ceramics having the plurality of through-holes 3 as shown in FIG. 7, and then heating these members to fire them, thereby integrally joining both the members to each other by the utilization of a difference between firing shrinkage ratios of both the members (this joining technique utilizing the difference between the firing shrinkage ratios will be hereinafter referred to as "firing join"). In this method, the tubes of the sintered ceramics having the small firing shrinkage which scarcely shrink are held by the perforated plates of the unsintered ceramics having the large firing shrinkage owing to the shrinkage of the through-holes by the firing, whereby both the members can be integrally joined.

In this case, the firing can usually be carried out in such a condition as shown in FIG. 8 where in a sagger having a sealed structure for the purposes of preventing contamination with carbon and the like from furnace materials and of regulating an atmosphere, a setter 4 is placed, tubes 2 are stood on this setter 4 so as to be vertical to a floor surface, and perforated plates 1 are positioned at both the upper and lower end portions of the tubes 2 by the use of jigs 5.

In this connection, the jigs which can be used in the manufacture of the aforesaid joined ceramic structure are merely inserted between the upper and lower perforated plates, and they do not have a structure which can be fixed by the perforated plates. Therefore, during the firing step, a position deviation easily occurs, the perforated plates might be broken, and the shape accuracy and airtightness of the joined structure tend to deteriorate, owing to the shrinkage of the perforated plates by the firing.

SUMMARY OF THE INVENTION

The present invention has been attained in view of the above-mentioned conventional problems. An object of the present invention is to provide jigs which scarcely give rise to position deviation in a firing step in a method for manufacturing a joined structure of such perforated ceramic plates and ceramic tubes as mentioned above, and another object of the present invention is to provide a method for manufacturing a joined ceramic structure by the use of the jig.

According to the present invention, there can be provided jigs usable in a method for manufacturing a joined ceramic structure comprising a plurality of tubes and perforated plates joined to both the end portions of the tubes which comprises the steps of inserting the tubes of sintered ceramics into through-holes of the perforated plates of unsintered ceramics having a plurality of the through-holes, standing the tubes vertically to a floor surface, and then firing them in a condition where the perforated plates are positioned at the upper and lower end portions of the tubes, thereby integrally joining both the members by the utilization of a difference between firing shrinkage ratios of both the members, said jigs comprising end portions which are inserted into jig fixation orifices beforehand formed through the perforated plates and which have an outer diameter slightly smaller than a diameter of the orifices, and stems having an outer diameter larger than the diameter of the jig fixation orifices, said end portions and said stems being constituted so as to be detachably combined at engagement portions where they are engaged with each other without mutual restriction, said jigs being integrally combined with the joined ceramic structure after the completion of the joining.

Furthermore, according to the present invention, there can be provided a method for manufacturing a joined ceramic structure comprising a plurality of tubes and perforated plates joined to both the end portions of the tubes which comprises the steps of inserting the tubes of sintered ceramics into through-holes of the perforated plates of unsintered ceramics having a plurality of the through-holes, standing the tubes vertically to a floor surface, and then firing them in a condition where the perforated plates are positioned at the upper and lower end portions of the tubes, thereby integrally joining both the members by the utilization of a difference between firing shrinkage ratios of both the members, said method comprising the steps of previously forming jig fixation orifices in the perforated plates, and then positioning the perforated plates by the use of the above-mentioned jigs.

Incidentally, in the present invention, the unsintered ceramics mean molded articles (a green ware) or calcined articles (a calcined ware) of the ceramics.

DETAILED DESCRIPTION OF THE INVENTION

Figure 3:
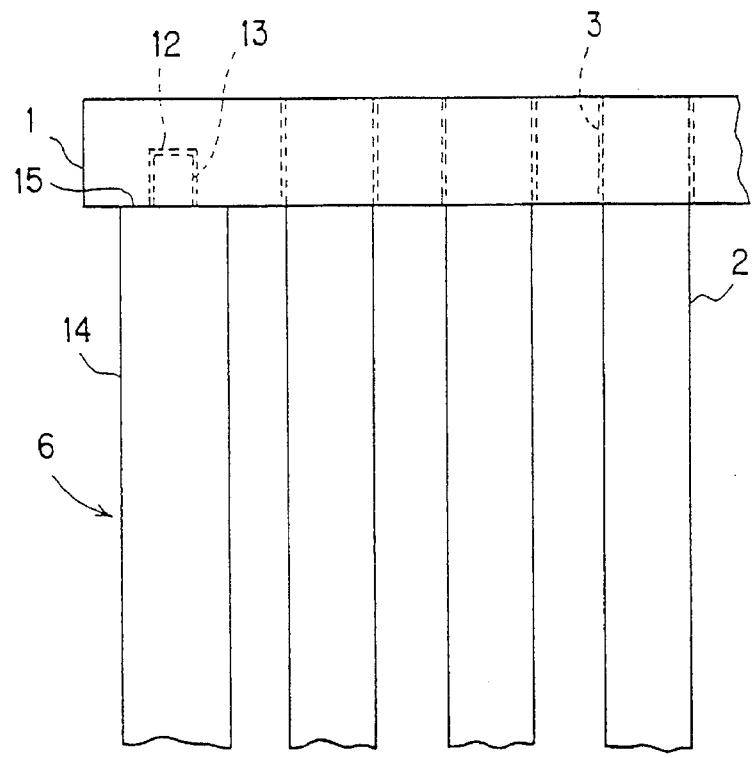
FIG. 3 is a sectional view illustrating the main portion of one example of a method for manufacturing a joined ceramic structure of the present invention.

As shown in FIG. 3, each perforated plate 1 is previously provided with jig fixation orifices 12, and end portions 13 of jigs 6 are inserted into and fixed to these orifices, so that the perforated plate 1 is supported on a step portion 15 defined by the end portion 13 and a stem 14. In this way, the distance between and the position of the upper and lower perforated plates 1 are held. Positioning is made in a condition where the end portions 13 of the jigs 6 are fixed to the perforated plates 1 to some extent, and this fixing state is maintained through the step of a firing join. After the joining, the jigs 6 are also fastened by the jig fixation orifices 12 at the end portions 13 owing to the shrinkage of the perforated plates 1 by the firing, so that the jigs are integrally combined with a joined structure, whereby the position deviation of the perforated plates 1 by the firing shrinkage can be effectively prevented. In this connection, reference numeral 2 in the drawing represents tubes, and numeral 3 represents through-holes formed in the perforated plates 1.

The outer diameter of the end portions of the jigs is set so as to be slightly smaller than the diameter of the jig fixation orifices 12 (an orifice diameter before the firing) previously formed in the perforated plates, but this "slightly smaller" means such an outer diameter size that the end portions of the jigs are fixed to the perforated plates to some extent through the step of the firing join and that the jigs are integrally combined with the perforated plates by the firing shrinkage of the perforated plates.

The jig fixation orifices formed in the perforated plates may be through-holes or do not have to be through-holes, so long as they have a depth larger than the length of the end portions of the jigs which are inserted into the orifices.

Figure 1:
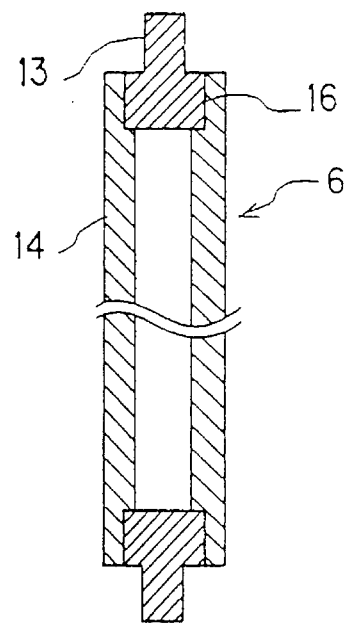
FIG. 1 is a sectional view illustrating one example of a jig regarding the present invention.

As shown in FIG. 1, the jig 6 of the present invention is not integrally molded, and the end portion 13 and the stem 14 are detachably formed, and they can be engaged with each other at an engagement portion 16 without mutual restriction. As is apparent from the foregoing, by constituting so as not to restrict both the members, i.e., by giving some clearance to the engagement portion 16, stress which is applied to the jig during the firing join step, for example, owing to a difference between coefficients of thermal expansion of the member to be joined and the jig can be relieved in this clearance portion, whereby the breakage and deformation of the jig in the firing join step can be prevented.

Incidentally, as shown in FIG. 1, the stems 14 of the jigs 6 preferably have a hollow tubular structure for weight reduction.

Figure 5:
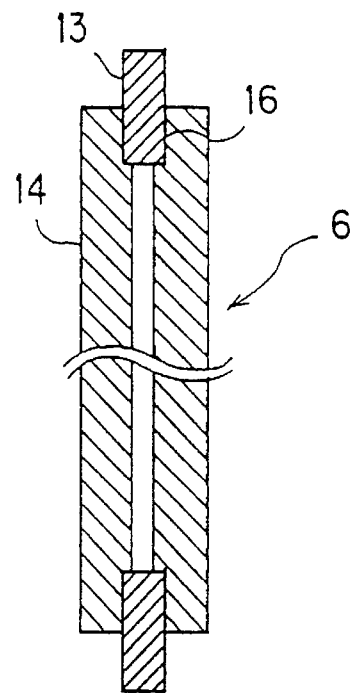
FIG. 5 is a sectional view illustrating one example of the jig regarding the present invention.
Figure 6:
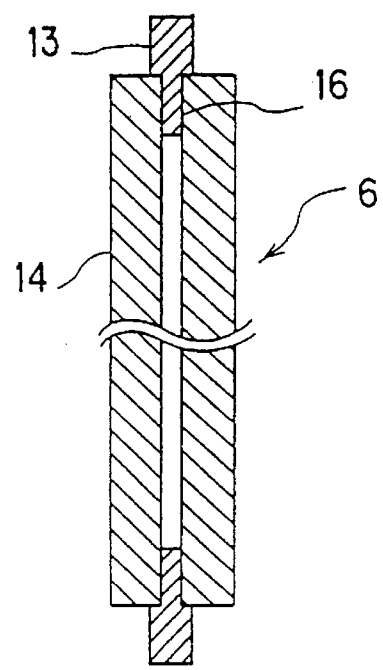
FIG. 6 is a sectional view illustrating another example of the jig regarding the present invention.
Figure 7:
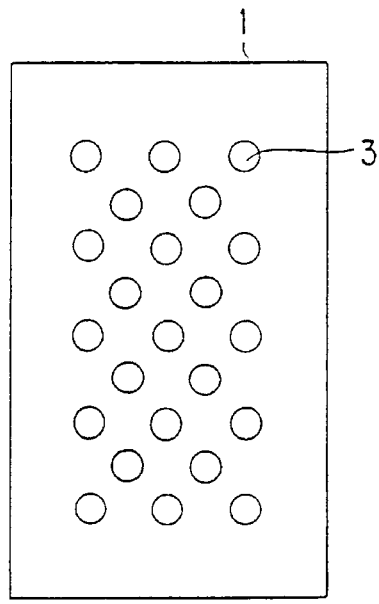
FIG. 7 is a plan view of a perforated plate.

The engagement portion 16 can be provided, for example, as shown in FIG. 1, by forming, integrally with the end portion 13 and into a convex shape, an engagement segment of the end portion 13 having a diameter larger than that of the end portion 13, and by forming an engagement segment of the stem 14 having an inner diameter expanded so as to receive, with some clearance, the engagement segment having the diameter larger than that of the end portion 13. Alternatively, as shown in FIG. 5, the engagement segment of the end portion 13 may have the same diameter as the end portion 13, or as shown in FIG. 6, the engagement segment of the end portion 13 may have a diameter smaller than the end portion.

From the viewpoints of performances of the jig such as support stability and strength, such a structure of the engagement segments as in FIG. 1 is preferable. However, in the structure shown in FIG. 5, the end portion 13 having the engagement segment thereof can be prepared in the form of one column having no step, and in the structure shown in FIG. 6, it is not necessary to expand the inner diameter of the engagement segment of the stem 16, so that the stem 16 can be prepared in the form of the tube having no step. In consequence, the end portion 13 and the stem 16 shown in FIGS. 5 and 6, respectively, have an advantage that they can be easily manufactured.

Figure 2:
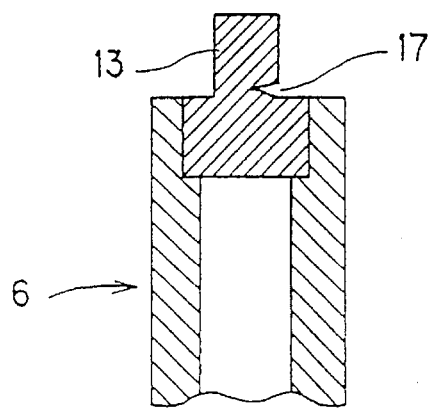
FIG. 2 is a sectional view illustrating the main portion of one example of the jig regarding the present invention in which a notch is formed in an end portion of the jig.

After the completion of the firing join, the jigs which are not necessary any more can be removed, when needed. However, as shown in FIG. 2, a notch 17 may be beforehand formed in the end portion 13, and in this case, after the completion of the joining, each jig 6 can be easily removed from the joined structure at the notch 17 only by applying a relatively small force to the jig 6.

The material for the jigs is preferably that which is not softened at a firing temperature during the firing join, and typical preferable examples of the jig material include sintered SiC and $Si_3N_4$ having heat resistance higher than the elements to be joined. Furthermore, the end portion and the stem may be made of one material or different materials, and for example, the stem can be made of sintered SiC and the end portion can be made of sintered $Si_3N_4$.

As ceramics for the joined structure, both of ceramics of an oxide and ceramics of a monoxide are usable, and the kind of ceramics can be suitably selected in consideration of a kind of structural members for the joined structure and conditions to be used. For example, silicon nitride and silicon carbide having high strength and high heat resistance can be employed, in the case that the joined structure is used in an engine, an industrial machine, a heat exchanger or the like. The perforated plates and the tubes may be made of one kind of ceramics or different kinds of ceramics. No particular restriction is put on the shape, thickness and size of the perforated plates, the number and arrangement of holes formed in each perforated plate, and the like, and they can be suitably selected in compliance with the purpose and conditions of use. The holes of the perforated plates may be formed simultaneously with the molding of plates having the fundamental shape of the perforated plates, or they may be formed by a means such as punching or ultrasonic working after the molding.

Next, the present invention will be described in more detail on the basis of examples, but the scope of the present invention should not be limited to these examples.

EXAMPLE

To 1000 g of a silicon nitride powder were added 10 g of $Y_2O_3$, 10 g of MgO, 5 g of $ZrO_2$ as sintering auxiliaries, and 1 g of polyvinyl alcohol as an organic binder, and 1000 g of water was further added thereto. Afterward, they were ground and mixed for 4 hours by the use of silicon nitride balls (diameter=5 mm) and an attritor. The resultant finely ground mixture was dried and granulated by a spray dryer to obtain a powder material. Next, tubular articles were molded from the thus obtained powder material by extrusion, and then dried at 110° C. for 10 hours. After the drying, the binder was burned out at 500° C. for 5 hours, and firing was further made at 1650° C, for 1 hour to obtain tubes having an outer diameter of 8 mm, an inner diameter of 6 mm and a length of 300 mm.

On the other hand, plate-like articles were molded from the same material as in the preparation of the tubes under a pressure of 7 tons/cm² by hydrostatic pressure press molding. Next, these articles were dried and the binder was burned out under the same conditions as in the preparation of the tubes, and calcination was further made at 1350° C. for 3 hours in a nitrogen atmosphere. Through the thus calcined articles having a size of 350×170 mm and a thickness of 20 mm, a plurality of through-holes having a diameter of 9.3 mm into which the tubes would be inserted for joining were formed by ultrasonic working, and jig fixation orifices were further formed at four corners of each plate-like article to obtain perforated plates.

Figure 4:
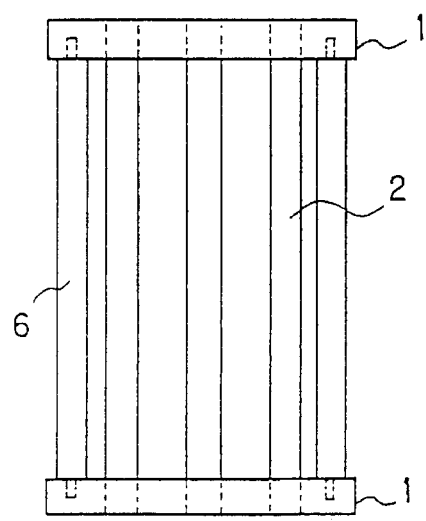
FIG. 4 is a schematic side view illustrating one example of the joined ceramic structure.

Next, end portions of the tubes were inserted into the through-holes of the thus obtained perforated plates, and the tubes were stood vertically to a floor surface. Afterward, the perforated plates were positioned at both the upper and lower end portions of the tubes by the use of jigs so that the perforated plates might be parallel with each other. As shown in FIG. 1, the jigs had a structure in which end portions 13 having a slightly smaller outer diameter than the diameter of the jig fixation orifices previously formed in the perforated plates was combined with stems 14 having a larger outer diameter than that of the orifices at engagement portions 16 without any restriction. The end portions 13 were made of sintered $Si_3N_4$ having higher heat resistance than a material for the tubes, and the stems 14 were made of sintered SiC. As shown in FIG. 3, positioning was carried out in a condition where the end portions 13 of the jigs 6 were inserted into the jig fixation orifices 12 of the perforated plates 1, and they were fired at 1600° C. for 3 hours on a setter in a nitrogen atmosphere to obtain a joined ceramic structure in which the perforated plates 1 were joined to the upper and lower portions of the tubes 2 and the jigs 6 as shown in FIG. 4. In this case, an interference of the firing join was 0.2 mm.

Figure 10:
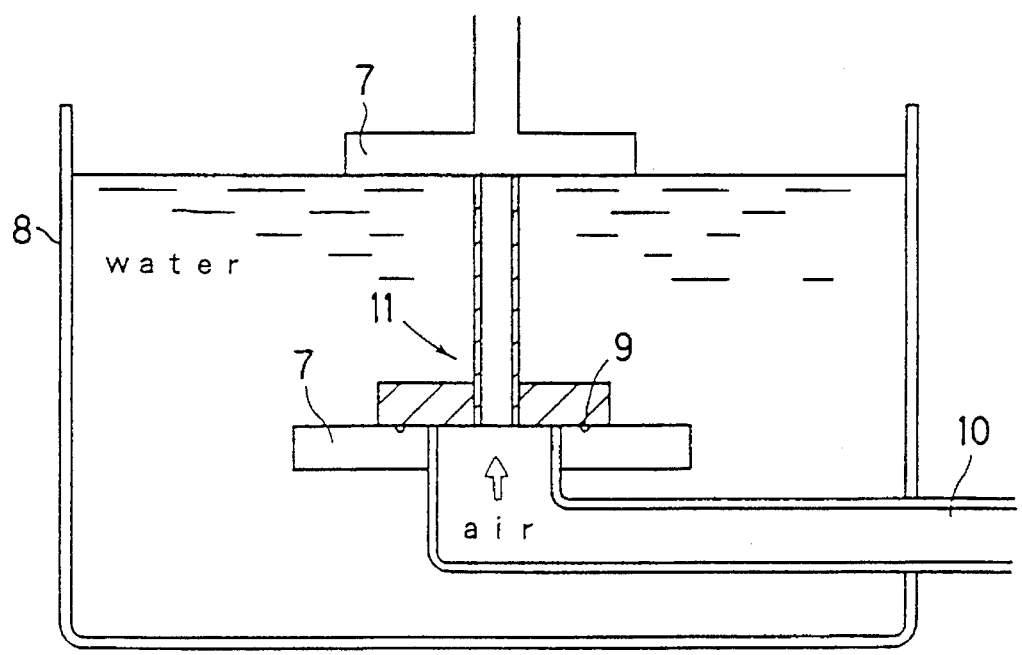
FIG. 10 is an illustrative view of an airtight testing machine.

In the perforated plates of the obtained joined ceramic structure, cracks were not observed. Furthermore, according to measurement, the flatness of the perforated plates was 0.1 mm, which meant that warp was scarcely present. In addition, from this joined ceramic structure, there was cut out a sample in which the perforated plate was joined only to the upper or the lower portion of one tube, and the airtightness of the joined portions was inspected by the use of an airtight testing machine shown in FIG. 10. The sample 11 was held by a holding jig 7 arranged in a water tank 8 in FIG. 10, and a space between the holding jig 7 and the sample 11 was sealed by an O-ring 9. In this condition, air was fed at 7 kg/cm² through an air passage 10 to inspect the leakage of air from the joined portions. As a result, any leakage was not observed. In addition, parallelism and torsion of the upper and lower perforated plates were good, 0.5 mm and 0.7 mm, respectively.

Comparative Example

The same procedure as in Example was carried out except that jig fixation orifices were not formed in perforated plates, to prepare tubes and the perforated plates.

Figure 8:
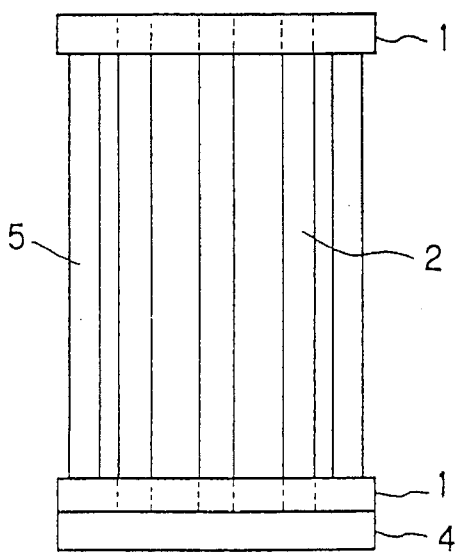
FIG. 8 is a schematic side view illustrating a conventional method for manufacturing the joined ceramic structure.
Figure 9:
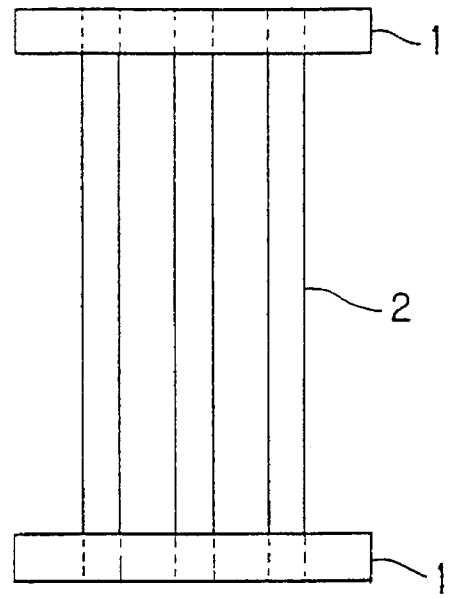
FIG. 9 is a schematic side view illustrating one example of the joined ceramic structure.

Next, end portions of the tubes were inserted into through-holes of the perforated plates, and the tubes 2 were stood vertically to a floor surface as shown in FIG. 8. Afterward, perforated plates 1 were positioned so as to be parallel with each other at upper and lower end portions of the tubes 2 by the use of jigs 5. Each jig 5 was an integral tubular article made of sintered SiC which was not softened at a firing temperature at the time of firing join. As shown in this drawing, the jigs 5 were positioned in a condition where they were merely inserted between the upper and lower perforated plates, and they were fired at 1600° C. on a setter 4 in a nitrogen atmosphere to obtain a joined ceramic structure in which the perforated plates 1 were joined to the upper and lower end portions of the tubes 2 as shown in FIG. 9. In this case, an interference of the firing join was 0.2 mm.

In the perforated plates of the obtained joined ceramic structure, some cracks were observed. Furthermore, the airtightness of the joined portions was inspected in the same manner as in the above-mentioned example, and as a result, the leakage of a considerable amount of air was observed. In addition, parallelism and torsion of the upper and lower perforated plates were large, 3 mm and 7 mm, respectively.

As described above, according to the present invention, in the manufacture of a joined structure of perforated ceramic plates and ceramic tubes by the utilization of a difference between firing shrinkage ratios, position deviation caused by the firing shrinkage of the perforated plates can be effectively prevented, whereby the joined ceramic structure having excellent shape accuracy and excellent airtightness at joined portions can be obtained.

What is claimed is:

1. Jigs usable in a method for manufacturing a joined ceramic structure comprising a plurality of tubes and perforated plates joined to both the end portions of these tubes which comprises the steps of inserting the tubes of sintered ceramics into through-holes of the perforated plates of unsintered ceramics having a plurality of the through-holes, standing the tubes vertically to a floor surface, and then firing them in a condition where the perforated plates are positioned at the upper and lower end portions of the tubes, thereby integrally joining both the members by the utilization of a difference between firing shrinkage ratios of both the members, said jigs comprising end portions which are inserted into jig fixation orifices beforehand formed through the perforated plates and which have an outer diameter slightly smaller than a diameter of the orifices, and stems having an outer diameter larger than the diameter of the jig fixation orifices, said end portions and said stems being constituted so as to be detachably combined at engagement portions where they are engaged with each other without mutual restriction, said jigs being integrally combined with the joined ceramic structure after the completion of the joining.

2. The jigs according to claim 1 which are made of a material which does not soften at a firing temperature in a joining step.

3. The jigs according to claim 2 wherein a notch is formed in an end portion of each jig.

4. The jigs according to claim 1 which are made of sintered SiC or sintered $Si_3N_4$.

5. The jigs according to claim 4 wherein a notch is formed in an end portion of each jig.

6. The jigs according claim 1 wherein a notch is formed in an end portion of each jig.

7. A method for manufacturing a joined ceramic structure comprising a plurality of tubes and perforated plates joined to both the end portions of these tubes which comprises the steps of inserting the tubes of sintered ceramics into through-holes of the perforated plates of unsintered ceramics having a plurality of the through-holes, standing the tubes vertically to a floor surface, and then firing them in a condition where the perforated plates are positioned at the upper and lower end portions of the tubes, thereby integrally joining both the members by the utilization of a difference between firing shrinkage ratios of both the members, said method comprising the steps of previously forming jig fixation orifices in the perforated plates, and then positioning the perforated plates by the use of jigs comprising end portions which are inserted into the jig fixation orifices and which have an outer diameter slightly smaller than a diameter of the orifices, and stems having an outer diameter larger than the diameter of the jig fixation orifices, said end portions and said stems being constituted so as to be detachably combined at engagement portions where they are engaged with each other without mutual restriction, said jigs being integrally combined with the joined ceramic structure after the completion of the joining.

* * * * *